United States Patent
Faust et al.

(10) Patent No.: US 11,878,275 B2
(45) Date of Patent: Jan. 23, 2024

(54) TEMPERATURE-RESISTANT POTTING MATERIAL FOR HOLLOW FIBER MEMBRANES

(71) Applicant: FRESENIUS MEDICAL CARE DEUTSCHLAND GMBH, Bad Homburg (DE)

(72) Inventors: Matthias Faust, Saarbrucken (DE); Manuel Wilhelm, St. Ingbert (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 582 days.

(21) Appl. No.: 16/972,629

(22) PCT Filed: Jun. 12, 2019

(86) PCT No.: PCT/EP2019/065325
§ 371 (c)(1),
(2) Date: Dec. 7, 2020

(87) PCT Pub. No.: WO2019/238742
PCT Pub. Date: Dec. 19, 2019

(65) Prior Publication Data
US 2021/0197124 A1  Jul. 1, 2021

(30) Foreign Application Priority Data
Jun. 13, 2018 (DE) .................... 10 2018 209 444.6

(51) Int. Cl.
*B01D 63/02* (2006.01)
*B01D 69/08* (2006.01)
(Continued)

(52) U.S. Cl.
CPC .......... *B01D 63/023* (2013.01); *B01D 69/08* (2013.01); *C08G 18/58* (2013.01); *C08G 18/809* (2013.01);
(Continued)

(58) Field of Classification Search
None
See application file for complete search history.

(56) References Cited

U.S. PATENT DOCUMENTS 4,359,359 A  11/1982 Gerlach et al.
5,484,832 A   1/1996 Garrett et al.
(Continued)

FOREIGN PATENT DOCUMENTS

CN  101250338 A   8/2008
CN  101855265 A  10/2010
(Continued)

OTHER PUBLICATIONS

Office Action issued in corresponding Japanese Patent Application 2020-568224 dated Jun. 6, 2023 (with English translation) (7 pages).
(Continued)

*Primary Examiner* — Krishnan S Menon
(74) *Attorney, Agent, or Firm* — Kilyk & Bowersox, P.L.L.C.

(57) ABSTRACT

The invention relates to a method for potting hollow fiber membranes in potting compounds of increased temperature resistance, wherein an isocyanate component with inorganic particles and a polyol component are processed into a potting compound and the hollow fiber membranes are tightly encased by the potting compound in at least one potting zone by the hardening of said potting compound.

20 Claims, 1 Drawing Sheet

(51) Int. Cl.

| | |
|---|---|
| *C08G 18/58* | (2006.01) |
| *C08G 18/80* | (2006.01) |
| *C08K 3/22* | (2006.01) |
| *C08K 3/36* | (2006.01) |
| *C08K 9/04* | (2006.01) |
| *C08L 75/04* | (2006.01) |

(52) U.S. Cl.
CPC .................. *C08K 3/22* (2013.01); *C08K 3/36* (2013.01); *C08K 9/04* (2013.01); *C08L 75/04* (2013.01); *C08G 2340/00* (2013.01); *C08K 2003/2227* (2013.01); *C08K 2003/2241* (2013.01); *C08K 2003/2244* (2013.01)

(56) References Cited

U.S. PATENT DOCUMENTS

| | | | |
|---|---|---|---|
| 5,693,696 | A | 12/1997 | Garrett et al. |
| 6,433,059 | B1 | 8/2002 | Capps |
| 2009/0124727 | A1 | 5/2009 | Nennemann et al. |
| 2009/0238967 | A1 | 9/2009 | Helff et al. |
| 2011/0124760 | A1 | 5/2011 | Chen et al. |
| 2012/0041142 | A1 | 2/2012 | Nennemann et al. |
| 2012/0101210 | A1 | 4/2012 | Nennemann et al. |
| 2012/0196967 | A1 | 8/2012 | Iwao et al. |
| 2013/0158210 | A1 | 6/2013 | Hossain et al. |
| 2014/0217023 | A1 | 8/2014 | Lee |
| 2014/0329964 | A1 | 11/2014 | Guha et al. |
| 2016/0096142 | A1 | 4/2016 | Harris et al. |
| 2016/0145476 | A1 | 5/2016 | Jordan, Jr. et al. |
| 2019/0381462 | A1 | 12/2019 | Keller et al. |

FOREIGN PATENT DOCUMENTS

| | | |
|---|---|---|
| CN | 102365333 A | 2/2012 |
| CN | 102449014 A | 5/2012 |
| CN | 102449015 A | 5/2012 |
| CN | 102504518 A | 6/2012 |
| CN | 102558828 A | 7/2012 |
| CN | 103124755 A | 5/2013 |
| CN | 106336495 A | 1/2017 |
| EP | 1992399 A1 | 11/2008 |
| EP | 2024067 A1 | 2/2009 |
| EP | 2236532 A1 | 10/2010 |
| EP | 2644662 A1 | 10/2013 |
| JP | 3-262522 A | 11/1991 |
| JP | 2005060675 A | 3/2005 |
| JP | 2011105940 A | 6/2011 |
| JP | 2017536459 A | 12/2017 |
| KR | 20040077485 A | 9/2004 |
| KR | 10-2009-0119372 A | 11/2009 |
| WO | 2018104498 A2 | 6/2018 |

OTHER PUBLICATIONS

Yatabe et al., "Preparation of hydrophobic silica by using isocyanates," Journal of the Ceramic Society of Japan, 1994, vol. 102, No. 6, pp. 594-597 (w/English abstract on p. 594).

Ou et al., "Functionalized TiO2 nanoparticle containing isocyanate groups," Materials Chemistry and Physics, 2012, vol. 135, pp. 1104-1107.

International Search Report and Written Opinion issued in corresponding International Patent Application No. PCT/EP2019/065325 (with English translation of International Search Report) dated Oct. 16, 2019 (14 pages).

Ou et al., "Functionalized TiO2 nanoparticle containing isocyanate groups," Materials Chemistry and Physics, vol. 135, No. 2, (Jun. 13, 2012), pp. 1104-1107.

Yatabe et al., "Preparation of Hydrophobic Silica with Isocyanates," Journal of the Ceramic Society of Japan, International Edition, vol. 102, No. 6, (Jun. 1, 1994), Tokyo, JP, pp. 595-598.

Office Action issued in corresponding Chinese Patent Application 201980036411.7 dated Apr. 2, 2022 (with English translation) (15 pages).

Zhihua et al., "Influence of Nano-SiO2 Particles on Thermal Stability of PU Resin," China Plastics Industry, Nov. 21, 2003, vol. 31, Issue 7, pp. 37-39 (w/English abstract on p. 39 and relevance set forth in English translation of Chinese Office Action submitted herewith).

Hongyan et al., "Surface Functional Modification of Nanosized Alpha Alumina and Its Characterisation," Journal of Xi'an Jiaotong University, Feb. 2006, vol. 40, No. 2, pp. 219-221 (w/English abstract on p. 219 and relevance set forth in English translation of Chinese Office Action submitted herewith).

International Preliminary Report on Patentability issued in corresponding International Patent Application No. PCT/EP2019/065325 (English translation) dated Oct. 16, 2019 (6 pages).

TEMPERATURE-RESISTANT POTTING MATERIAL FOR HOLLOW FIBER MEMBRANES

This application is a National Stage Application of PCT/EP2019/065325, filed Jun. 12, 2019, which claims priority to German Patent Application No. 10 2018 209 444.6, filed Jun. 13, 2018.

The invention relates to a method for potting a plurality of hollow fiber membranes with a potting compound to produce a potting zone consisting of a polyurethane resin. The invention further relates to a hollow fiber membrane filter comprising a plurality of hollow fiber membranes potted in a polyurethane resin in at least one potting zone. The invention moreover relates to an isocyanate group-containing adduct for producing a polyurethane resin. The invention furthermore relates to the use of the isocyanate group-containing adduct in methods for potting hollow fiber membranes.

BACKGROUND OF THE INVENTION

Hollow fiber membrane filters are used in filtration procedures in water treatment and in the medical field, for example in the extracorporeal blood treatment of patients with kidney disease. During the production of hollow fiber membrane filters, a plurality of hollow fiber membranes, which are usually combined into hollow fiber membrane bundles, are placed into a filter module housing and the ends of the hollow fiber membranes inside the housing potted with a potting compound. The production of such hollow fiber membrane filters is known in the prior art.

A potting compound which is flowable at room temperature is usually used for potting the ends of the hollow fiber membranes. Such potting compounds normally consist of a mixture of multiple components, particularly prepolymeric components. The components are designed so as to harden into a resin within a certain time after mixing and by chemical reaction. The time during which the potting compound remains flowable and processable is referred to as the pot life. The potting compounds for potting hollow fiber membranes are therefore mixed together from the individual components just prior to potting. The potting compound is thereby initially in a flowable state after the components are mixed together and can thus be used for potting hollow fiber membranes. Particularly important in the potting of hollow fiber membranes is for the flowable potting compound to be able to disperse through the hollow fiber membrane bundle and for the individual hollow fiber membranes to be embedded by the potting compound within the potting zone.

Potting compounds need to be specially designed for the potting of hollow fiber membrane bundles. The hollow fiber membrane filters used in water treatment and in medicine comprise hollow fiber membrane bundles which can consist of 15,000 or more hollow fiber membranes. A single hollow fiber membrane thereby usually exhibits a diameter of from 150 to 350 µm. The packing densities of the hollow fiber membrane bundles can be 60% and higher. Suitable potting compounds must therefore be sufficiently flowable so as to encase each individual hollow fiber membrane in the potting zone. Moreover, the potting compounds must however also be able to harden such that the hardened resin has sufficient mechanical strength to compensate mechanical loads caused, for example, by thermal stressing.

Potting compounds which harden into polyurethane resins are normally used for potting hollow fiber membrane bundles. Polyurethane resins are classified as harmless, particularly from a medical perspective, e.g. when used for potting compounds in dialysis filters. Furthermore, hollow fiber membrane filters having hollow fiber membranes potted with polyurethane resins are also suited to withstanding the thermal conditions of heat sterilization over the short term.

Common potting compounds processed into polyurethane resins are substantially made from two components. A first component contains organic polyol compounds. Compounds containing polyols can for example be polyvalent alcohols, sugar compounds or polymer compounds with hydroxy end groups. For example, polyether polyols or polyester polyols are used as polymeric polyols. A diisocyanate component is used as the further component.

The polyol component and the isocyanate component are mixed into a potting compound and initially remain flowable and processable within the pot life. Such potting compounds are usually used for potting hollow fiber membrane bundles during the production of hollow fiber membrane filters. The production of such hollow fiber membrane filters is known in the prior art. EP 2 024 067 A1 describes a method for potting hollow fiber membranes in part of a hollow fiber membrane filter housing. In the method, the flowable potting compound is introduced into the end portion of the hollow fiber membranes under rotation. The rotational forces cause the flowable potting compound to disperse within the end portion of the hollow fiber membranes and the hollow fiber membranes are embedded in the potting compound. The potting compound is subsequently hardened to polyurethane resin so that the hollow fiber membranes are fixed in the housing part by the potting zones at the end.

It has, however, been shown that the use of potting compounds, as they are used in the production of dialysis filters and filters for water treatment, is not generally satisfactory for all filtration applications. In particular, industrial processing of aqueous liquids or domestic applications require lengthy filtrations at increased temperatures. At high temperatures, filtration applications have the problem of lower hardness to the potting compounds hardened into polyurethane resins and the polyurethane resin being subject to hydrolysis. This negatively affects the adhesion of the potting compound to the parts of the housing and to the hollow fiber membranes and leakage in the hollow fiber membrane filter can be expected as a result.

EP 1 992 399 A1 describes a potting material having a filler in a hollow fiber membrane filter with improved potting material crawling height. The percentage of filler in the potting material is thereby under a concentration of approximately 3%, that being associated with too sharp of an increase in the potting material viscosity. Silica is specified as the filler. The improved crawling height improves the tightness of the potting.

EP 2 644 662 A1 describes a hollow fiber membrane module of sufficient stability with respect to steam sterilization and consistently stable filtration properties. The hollow fiber membrane module comprises a polyurethane resin as potting material, the tensile strength of which decreases less than 25% subsequent contact with saturated steam at 121° C. for 24 hours. The addition of a filler serves in dissipating heat during potting and prevents material shrinkage and cracking. Silica, calcium carbonate and glass fibers are cited as the filler material.

U.S. Pat. No. 4,359,359 describes the production of an embedding material from polyurethane in order to improve the degree of hardness and the reaction time of the embedding material. The embedding material is yielded by the reaction of an aromatic diisocyanate, a castor oil and a trimethylolpropane. To improve the rheological properties, a silica acid-based thixotropic additive can be added to the embedding material.

US2014/0217023 describes a filtering system having a plurality of hollow fiber membranes embedded in a thermosetting potting material. The potting material can consists of a urethane resin which contains fillers, e.g. silica, in order to improve tensile strength and prevent material shrinkage.

The underlying prior art discloses no potting compounds having good processability properties in the liquid state in terms of potting a hollow fiber membrane and exhibiting increased thermal stability in the hardened state. The known potting compounds hardened to polyurethane resins are thus in need of improvement with respect to thermostability.

TASK OF THE INVENTION

In a first aspect of the invention, the task is therefore that of providing a method for potting hollow fiber membranes in a potting compound hardening to a polyurethane resin so as to obtain a potting zone of increased thermal stability.

In a further aspect of the invention, the task is that of providing a hollow fiber membrane filter having a plurality of hollow fiber membranes embedded in a polyurethane resin in a potting zone and characterized by improved temperature resistance.

In a further aspect of the invention, the task is that of providing an isocyanate group-containing adduct which exhibits increased temperature resistance after reacting with a polyol component and hardening into a polyurethane resin.

In a fourth aspect, the task is that of specifying a use of an adduct containing isocyanate in a method for potting a plurality of hollow fiber membranes in the production of filter modules, wherein the modules exhibit increased temperature resistance.

SUMMARY OF THE INVENTION

In a first aspect of the invention, the task is solved by a method for potting hollow fiber membranes according to claim 1. Claims 2 to 8 constitute preferential embodiments.

In a second aspect of the invention, the task is solved by a hollow fiber membrane filter according to claim 9. Claims 10 to 14 constitute preferential embodiments.

In a third aspect of the invention, the task is solved by an isocyanate group-containing adduct according to claim 15. Claims 16 to 19 constitute preferential embodiments.

In a fourth aspect of the invention, the task is solved by the use of an isocyanate group-containing adduct according to at least one of claims 16 to 19 in a method for potting a plurality of hollow fiber membranes when producing filter modules for nanofiltration, ultrafiltration or microfiltration.

DETAILED DESCRIPTION OF THE INVENTION

In a first aspect, the invention relates to a method for potting hollow fiber membranes which comprises the steps:
  (i) Providing a plurality of hollow fiber membranes,
  (ii) Reacting an isocyanate component containing at least one diisocyanate compound with inorganic particles containing hydroxy groups to form a compound comprising an isocyanate group-containing adduct, whereby the isocyanate groups of the isocyanate component are present in stoichiometric excess relative to the hydroxy groups of the hydroxy group-containing inorganic particles, and whereby at least a portion of the hydroxy groups of the hydroxy group-containing inorganic particles reacts with at least a portion of the isocyanate groups of the isocyanate component into urethane bonds,
  (iii) Mixing the obtained compound containing the isocyanate group-containing adduct with a polyol component containing at least one diol compound into a potting compound,
  (iv) Potting the hollow fiber membranes with the potting compound in at least one potting zone,
  (v) Hardening the potting compound in the potting zone into a polyurethane resin.

According to the inventive method, it is possible to embed hollow fiber membranes in a polyurethane resin which exhibits higher thermal stability. It was found that forming the isocyanate-containing adduct from hydroxy group-containing inorganic particles and the isocyanate component effects the improved thermal stability of the potting compound hardened into the polyurethane resin. The glass transition temperature is to be deemed as a measure of the thermal stability. A higher glass transition temperature of the polyurethane resin therefore also represents higher material strength at higher temperatures. In particular, the inventive method enables polyurethane resin potting zones to be produced which have glass transition temperatures of 3° C., in particular 5° C., further particularly 8° C. higher than the glass transition temperatures of polyurethane resins not produced according to the inventive method although using the same polyol and isocyanate compound. The stability of the polyurethane resin in the potting zone between hollow fiber membranes and parts of the hollow fiber membrane filter housing is thereby improved at higher temperatures so as to yield an overall higher reliability of the tightness of the polyurethane resin.

The inventive method initially proceeds from a plurality of hollow fiber membranes, whereby the hollow fiber membranes are provided for the potting. The plurality of hollow fiber membranes is preferably a hollow fiber membrane bundle. The bundling of hollow fiber membranes into hollow fiber membrane bundles is known in the prior art and in the producing of hollow fiber membrane filter modules. Preferably, a hollow fiber membrane bundle is provided for the inventive method in part of a housing, in particular in part of a housing for a hollow fiber membrane filter module. To be understood by a "plurality" of hollow fiber membranes is a number of hollow fiber membranes as commonly used during processes of producing hollow fiber membrane filter modules. Known in this respect are hollow fiber membrane filter modules having a count of from 100 to 55,000 hollow fiber membranes. In comparison, however, experimental modules with a lesser number of hollow fiber membranes of up to 10 or less were also potted for development purposes.

The inventive method further initially proceeds from an isocyanate component. An "isocyanate component" in the sense of the present invention is to be understood as a compound of difunctional, trifunctional and multifunctional organic isocyanate compounds. What is essential is for the isocyanate component to contain diisocyanate compounds able to react to a polymer under polyaddition with a polyol component by forming a urethane bond. To a lesser extent, monoisocyanate compounds and multifunctional isocyanates can also be present in the isocyanate component. It is also possible in the sense of the present invention for the isocyanate component to rely on compounds of isocyanate-group-functionalized prepolymers. Such prepolymers can be obtained by polymerization of diisocyanate monomers. One example of a polymeric isocyanate is PMDI (polymeric diphenylmethane diisocyanate). It is further possible for the isocyanate component used according to the inventive method to comprise a mixture of isocyanate group-containing prepolymers and monomeric isocyanate group-containing compounds. Examples of suitable monomeric isocyanates are HDI (hexamethylene diisocyanate), TDI (toluylene diidocyanate), MDI (methylene diphenylene diisocyanate), NDI (naphthylene diisocyanate), IPDI (isophorone diisocyanate) and H12MDI (4,4'-methylene dicyclohexyl diisocyanate). The isocyanate component can comprise further additives which support the reaction of the isocyanate component with the polyol component or serve in the polyurethane resin's resistance to aging.

Preferably, the isocyanate component is in liquid state at room temperature. It is in particular advantageous for the isocyanate component to comprise percentages of liquid diisocyanate compounds. The isocyanate component can also contain diisocyanate compounds which in themselves are solid, ceraceous or viscous. In this case, it is advantageous for such diisocyanate compounds to be dissolved in a percentage of liquid diisocyanate compounds. In particular, a liquid isocyanate component is provided for the inventive method. The liquid isocyanate component used in accordance with the inventive method advantageously has a viscosity of 50 to 1000 mPa*s, preferentially 500 to 1000 mPa*s, measured at 25° C. with a VT550 viscometer from the Haake company, Germany, at level r.3 (30 rpm) using an "MV1 (MV-DIN)" rotor from the Haake company (shear rate 38.7/s). A low viscosity to the isocyanate component enables good processing of the potting compound during the pot life, in particular a complete embedding of the hollow fiber membranes in the potting compound.

Hydroxy group-containing inorganic particles are furthermore used in the inventive method. The hydroxy group-containing inorganic particles can be the form of a powder or initially as granulates in compacted or porous form. Comminution processes can bring the hydroxy group-containing particles into the desired particle size. Preferentially, however, the inorganic particles are obtained by precipitation in a sol-gel process or produced in a pyrogenic process since doing so can form particles of particularly small particle size. The hydroxy groups of the inorganic particles can already have been formed in the inorganic particle production process. Alternatively, the hydroxy groups can also be obtained by functionalizing the surface of the inorganic particles. Experience has shown that hydroxy groups also form in pyrogenic products shortly after being stored under ambient conditions.

The conversion of the isocyanate component with the hydroxy group-containing inorganic particles into a compound containing the isocyanate group-containing adduct preferably occurs in a container and under stirring. The hydroxy group-containing particles are thereby added to a liquid preparation of the isocyanate component and stirred, if applicable also under the additional effect of ultrasound. In the sense of the present invention, "conversion" is to be understood as a reaction leading to formation of a chemical bond. In the sense of the present invention, "chemical bond" refers to covalent bonds and coordinative bonds. The number of isocyanate groups in the produced isocyanate component is thereby present in a stoichiometric excess relative to the hydroxy bond yielded by the hydroxy group-containing inorganic particles. The conversion thereby ensues such that free isocyanate groups are present in the isocyanate group-containing adduct post-conversion. "Free isocyanate groups" are to be understood as reactive isocyanate groups which are not bound to the hydroxy groups of the hydroxy group-containing particles and thus capable of reacting with the hydroxy groups of the polyol component. In the sense of the present invention, "isocyanate group-containing adduct" is to be understood as a compound forming from the isocyanate component and the hydroxy group-containing inorganic particles by chemical reaction.

The compound obtained by the reaction of the isocyanate component with the hydroxy group-containing inorganic particles is a mixture of different compounds. Inorganic particles can thereby be bound by the reaction of the hydroxy groups to one or more isocyanate compounds of the isocyanate component by chemical reaction and formation of urethane bonds. Isocyanate compounds which are not bond to inorganic particles by chemical reaction can additionally be present in the compound. Advantageous during the reaction is for all possible reactive hydroxy groups of the hydroxy group-containing inorganic particles to be converted by chemical reaction. The continuation of the conversion of the hydroxy groups can in this respect be continuously monitored by analytical methods and an end point of the isocyanate component reaction with the hydroxy group-containing inorganic particles determined therefrom. Pursuant to the invention, the conversion to the isocyanate group-containing adduct occurs within 0.5 h or 1 h or 5 h or 1 day or 2 days at room temperature. Thereby important is for the reaction of the compound containing isocyanate group-containing adduct with the isocyanate component not to lead to a macroscopic cross-linking since the isocyanate group-containing adduct cannot otherwise adequately mix with the polyol component. In consequence, the further step of hardening and the thorough potting of the hollow fiber membranes will also be hindered. In the sense of the present invention, "macroscopic cross-linking" is to be understood as the visible formation of polymeric precipitates or gels.

Low-molecular and high-molecular polyol compounds can be used for mixing the polyol component with the compound containing the isocyanate group-containing adduct. Suitable low-molecular polyols are e.g. ethylene glycol, diethylene glycol, propylene glycol, dipropylene glycol, 1,3-butanediol or 1,4-butanediol. Polyether polyols are suitable high-molecular polyols such as e.g. polyethylene glycols, polypropylene glycols, polytetra-methylene glycol ethers alongside polyester polyols, polycaprolactone polyols and linear or branched castor oils. Mixtures of the aforesaid polyols can also be used as polyol components. Essential is for the polyol component to comprise a diol compound which is able to react with a diisocyanate compound under polyaddition to form a polyurethane. Monohydroxycompounds, trihydroxycompounds and polyhydroxycompounds can be present in the polyol component to a lesser extent. Mono-, tri- and polyhydroxycompounds are used to regulate the chain length and the degree of branching of the polyurethane resins obtained by the hardening of the potting compounds.

Preferentially, the polyol component is in the liquid state at room temperature. It is in particular advantageous for the polyol component to comprise a percentage of liquid diol compounds. The polyol component can also contain diol compounds which in themselves are solid, ceraceous or viscous. In this case, it is advantageous for such diol compounds to be dissolved in a percentage of liquid diol compounds. The polyol component used in accordance with the inventive method has a viscosity of 200-5500 mPa*s, preferentially 300-5000 mPa*s, measured at 25° C. with a VT550 viscometer from the Haake company, Germany, at level r.3 (30 rpm) using an "MV1 (MV-DIN)" rotor from the Haake company (shear rate 38.7/s). A low viscosity to the polyol component enables good processing of the potting compound during the pot life, in particular a complete embedding of the hollow fiber membranes in the potting compound.

The compound containing the isocyanate group-containing adduct is preferentially mixed with the polyol component in a container while being stirred and forms the potting compound. The mixing starts the hardening process of the potting compound into polyurethane resin. At first, the viscosity of the still-liquid potting compound decreases since the temperature increases as the reaction begins. As the reaction progresses further, however, the viscosity increases sharply to complete hardening despite the further rising temperature. Crossing the viscosity minimum ensures good processability and thereby also enables the potting to completely embed the hollow fiber membranes despite there being isocyanate-containing adduct in the potting compound. The packing density of the hollow fiber membranes is thereby to be factored in; i.e. that a potential particularly high packing density can necessitate a lower potting compound viscosity, which in this case can also limit the applicable adduct concentration in the potting compound. The hollow fiber membranes are preferably potted in a dip casting process or in a rotation process. In a "dip casting process," a section of the provided hollow fiber membranes is dipped into the liquid potting compound and subsequently hardened. The liquid potting compound thereby spreads between the hollow fiber membranes by capillary action. In a "rotation process," the provided hollow fiber membrane bundle is rotated. During the rotation, the potting compound is fed to a section of the hollow fiber membranes forming the potting zone. The liquid potting compound spreads between the hollow fiber membranes by capillary action and centrifugal forces. In respect of the rotation process, reference is made to the applicant's European application EP 2 024 067 A1.

Since the potting compound self-cures into a polyurethane resin by polyaddition directly after mixing, the potting compound typically hardens within 1 h at room temperature. Alternatively, temperatures of up to 80° C. or up to 70° C. or up to 60° C., in particular up to 45° C., can facilitate hardening and can result in reduced curing times of less than 20 minutes.

In one implementation of the first aspect, the inventive method is characterized by the hydroxy group-containing inorganic particles having a weight-average particle size of 200 nm or less, preferentially 150 nm or less, further preferentially 100 nm or less, further preferentially 50 nm or less, and at least 1 nm or greater, or 2 nm or greater, or 5 nm or greater. The weight-average particle size can be determined per known methods, for example by laser diffraction.

It can however also be determined by means of transmission electron microscopy. A sample of the particles is to that end measured in the transmission electron microscope, whereby the diameter and the aspect ratio for elongated particles are determined for a number of particles (approx. 1000). A particle size distribution can be determined therefrom. This method is particularly preferred with small particle sizes under 50 nm.

Hydroxy group-containing inorganic particles of low weight-average particle size are preferential since they can have a higher percentage of hydroxy groups and thus enable a higher number of urethane groups in the resulting isocyanate group-containing adduct. However, hydroxy group-containing particles which are too small in particle size are difficult to work with due to the agglomeration which occurs, making the most complete possible saturation of the hydroxy groups no longer able to be sufficiently ensured such that potentially a slightly lower increase in the glass transition point is to be obtained.

In a further implementation of the first aspect of the invention, the method for potting the hollow fiber membranes is characterized by the percentage of the hydroxy group-containing inorganic particles amounting to 2.3% by weight or less, preferentially 1.3 wt % or less, further preferentially 0.75 wt % or less, further preferentially 0.6 wt % or less, and 0.01 wt % or more, preferentially 0.05 wt % or more, further preferentially 0.1 wt % or more, further preferentially 0.15 wt % or more, or 2.3 wt % or less and 0.01 wt % or more, preferentially 1.3 wt % or less and 0.05 wt % or more, further preferentially 0.75 wt % or less and 0.1 wt % or more, further preferentially 0.6 wt % or less and 0.15 wt % or more in relation to the total weight of the potting compound.

The volume of hydroxy group-containing inorganic particles used also depends on the volume of the isocyanate groups present in the isocyanate component. In particular, when the percentage of hydroxy group-containing particles is too high, there is the risk of excessive macroscopic cross-linking. Additionally, the viscosity of the potting compound can increase so sharply that hollow fiber membrane filters of particularly high packing density can no longer be reliably produced in pressure-tight manner. On the other hand, a percentage which is too low can potentially result in a lower increase in the glass temperature of the polyurethane resins obtained by way of the inventive method.

In one implementation of the first aspect of the invention, the method for potting the hollow fiber membranes is characterized by the hydroxy group-containing inorganic particles being particles containing silicon dioxide ($SiO_2$), zirconium dioxide ($ZrO_2$), aluminum oxide ($Al_2O_3$) or titanium dioxide ($TiO_2$) or mixtures of these particles. Hydroxy group-containing particles made of silicon, alumina or titanium dioxide are particularly advantageous since they are stable as regards surface-bound hydroxy groups and the number of hydroxy groups can be determined with sufficient precision. Precisely knowing the number of hydroxy groups of the hydroxy group-containing inorganic particles serves in being able to adapt the necessary stoichiometric ratio of the isocyanate groups of the isocyanate component and the hydroxy groups in the polyol component to the production of the potting compound. Moreover, silicon, alumina and titanium dioxide particles are readily and economically available.

In a further implementation of the first aspect of the invention, the method for potting the hollow fiber membranes is characterized by the hydroxy group-containing inorganic particles having a hydroxy group number of $1\times10^{-5}$ mol/g to $1\times10^{-2}$ mol/g, preferentially $5\times10^{-4}$ mol/g to $1\times10^{-2}$ mol/g, relative to the mass of the hydroxy group-containing inorganic particles. At these concentration ratios to the hydroxy groups on the surface of the hydroxy group-containing particles, the adduct formation along with associated increase in glass transition temperature is particularly advantageous.

In a further implementation of the first aspect, the inventive method is characterized by the hydroxy group-containing inorganic particles being dried to constant weight at temperatures of from 100° C. to 150° C. prior to the reaction with the isocyanate component. Drying the hydroxy group-containing particles results in eliminating the water adsorbed on the surface of the particle. Water leads to side reactions with the isocyanate component and negatively affects the production of the potting compound and the hardening process. Drying the particles above 100° C. is effective in eliminating adsorbed water. An excessively high drying temperature can lead to cleavage of the surface-bound hydroxy groups and is therefore to be avoided.

In a further implementation of the first aspect of the invention, the method for potting the hollow fiber membranes is characterized by the compound having a molar ratio of isocyanate component isocyanate groups to hydroxy groups of the hydroxy group-containing inorganic particles of at least 100 to 1, preferentially at least 1000:1. Such a molar ratio has proven advantageous as it ensures sufficient saturation of the particles' hydroxy groups. Similarly, the preselected molar ratio leaves a sufficient number of free isocyanate groups, responsible for the subsequent development of the polyurethane resin. It was additionally seen that a molar ratio which is too low can lead to a diisocyanate molecule reacting with an isocyanate group to form a urethane bond with a hydroxy group and a second isocyanate group abreacting at the same time with a further hydroxy group. If the molar ratio is maintained, particularly high increases in the glass transition temperature result.

In a further implementation of the first aspect of the invention, the inventive method is characterized by the setting of an almost stoichiometric molar ratio of from 0.9-1.1 to 1.1-0.9, preferentially 0.99-1.01 to 1.01-0.99 to the hydroxy groups of the polyol component and the free isocyanate groups of the compound containing the isocyanate group-containing adduct. Particularly preferential is an exact 1 to 1 setting of the molar ratios. High conversions of the polyol component with the compound containing the isocyanate-containing adduct can be achieved by means of the molar ratio setting. This will thereby prevent the residual monomer content in the potting compound hardening into the poly-urethane resin which e.g. can be eluted by filtration of the potted hollow fiber membranes.

In a second aspect, the invention relates to a hollow fiber membrane filter comprising a plurality of hollow fiber membranes potted in a polyurethane resin in at least one potting zone characterized by the polyurethane resin comprising at least 0.01% to 2.3% by weight of inorganic particles bonded in the polyurethane resin via urethane bonds relative to the total weight of the polyurethane resin. The volume of the inorganic particles also depends on the volume of the urethane bonds able to be formed between the inorganic particles and the polyurethane resin. In particular, with too high of an inorganic particle percentage, which can occur with the hydroxy group-containing inorganic particles as per one implementation of the first aspect of the invention, there is the risk of the potting compound not being able to convert into the polyurethane resin. With too low of a percentage, the increase in the polyurethane resin's glass temperature is too low.

In one implementation of the second aspect of the invention, the hollow fiber membrane filter is characterized by inorganic particles bound in the polyurethane resin by the urethane bonds being particles of silicon dioxide ($SiO_2$), zirconium dioxide ($ZrO_2$), aluminum oxide ($Al_2O_3$) or titanium dioxide ($TiO_2$) or mixtures of these particles. Silica-containing and titanium dioxide-containing particles are particularly advantageous since the particle size and the urethane bonds can be determined with sufficient precision. Knowing the number of urethane bonds by which the particles are embedded in the polyurethane resin is important in order to be able to regulate the thermal stability of the polyurethane resin.

In a further implementation of the second aspect of the invention, the hollow fiber membrane filter is characterized by the inorganic particles having a weight-average particle size of 200 nm or less, preferentially 150 nm or less, further preferentially 100 nm or less, further preferentially 50 nm or less, and at least 1 nm or greater, or 2 nm or greater, or 5 nm or greater. Smaller average particle sizes are preferential as these particles exhibit a higher number of hydroxy groups. Particle sizes which are too small can be disadvantageous due to agglomeration.

In a further implementation of the second aspect of the invention, the hollow fiber membrane filter is characterized by the polyurethane resin amounting to 1.3% by weight or less, preferentially 0.75 wt % or less, further preferentially 0.6 wt % or less, and 0.05 wt % or more, further preferentially 0.1 wt % or more, further preferentially 0.15 wt % or more, or 1.3 wt % or less and 0.05 wt % or more, further preferentially 0.75 wt % or less and 0.1 wt % or more, further preferentially 0.6 wt % or less and 0.15 wt %, whereby the weight percentages are based on the total weight of the polyurethane resin.

In a further implementation of the second aspect of the invention, the hollow fiber membrane filter is characterized by the polyurethane resin having a glass transition temperature which is 3° C. or higher, preferentially 5° C. or higher, further preferentially 7° C. or higher, or preferentially up to 12° C., further preferentially up to 14° C. higher than an equivalent polyurethane resin not comprising any urethane-bound inorganic particles but yet produced from the same isocyanate component and the same polyol component. The glass transition temperature is determined pursuant to the "DSC measuring method." It was shown that the polyurethane resin containing urethane-bonded inorganic particles has higher temperature resistance. This is particularly important with water filters which are operated at higher temperature. The inventive hollow fiber membrane filters in this case exhibit particularly good stability, in particular hydrolytic resistance.

In a further embodiment of the second aspect of the invention, the hollow fiber membrane filter is characterized by the hollow fiber membranes being potted in the polyurethane resin pursuant to at least one of the embodiments according to the first aspect.

In a further embodiment of the second aspect of the invention, the hollow fiber membrane filter is characterized by the space-filling packing density of the hollow fiber membranes in the housing of the hollow fiber membrane filter amounting to 50 to 70%, in particular 60 to 70%, further particularly 55 to 65%. In the case of cylindrical hollow fiber membrane filters having hollow fiber membranes of the same diameter, the packing density results from the square of the diameter of the hollow fiber membranes to the diameter of the housing:

$$\delta_{(packing\ density)} = n \cdot \frac{d^2_{(fiber)}}{d^2_{(housing)}}$$

where n indicates the number of hollow fibers,
where $d_{(fiber)}$ indicates the diameter of the hollow fiber membrane; diameter measured from the outer membrane surface (outer diameter),
where $d_{(housing)}$ indicates the diameter of the housing; measured as the inner width of the housing (inside diameter).

With such high packing densities, it is particularly difficult to provide pressure-tight and watertight potting of the hollow fibers of the hollow fiber membrane filter. On the one hand, the potting compound needs to have a particularly low viscosity prior to hardening since the spaces between the fibers are particularly close; on the other hand, good resistance to heat and hot water is desired, which low-viscosity potting compounds often do not achieve. Hollow fiber membrane filters comprising the inventive polyurethane resin are potted in pressure-tight manner and exhibit a high temperature resistance.

A third aspect of the invention relates to the isocyanate group-containing adduct, obtained by reacting at least one isocyanate component containing at least one diisocyanate compound and hydroxy group-containing inorganic particles, wherein at least one portion of the hydroxy groups of the hydroxy group-containing inorganic particles are reacted with at least one portion of the isocyanate groups of the isocyanate component into a urethane bond, and wherein free isocyanate groups are present in the obtained adduct. The isocyanate group-containing adduct has the advantage of being able to be mixed together with a polyol component into a hardenable potting compound which ensures good processability over the pot life and complete embedding of the hollow fiber membranes in the potting compound. Furthermore, the isocyanate group-containing adduct offers the advantage of the potting compound hardened into the polyurethane resin having a higher glass transition temperature and the polyurethane resin thereby having improved thermal stability in filtration applications at increased temperatures.

In one embodiment of the third aspect, the isocyanate group-containing adduct is characterized by at least 70%, preferentially at least 90%, further preferentially at least 98% of all reactive hydroxy groups of the inorganic particles converting into urethane bonds. In this context, "reactive" is to be understood as the reactivity relative to isocyanate groups in terms of conversion to an urethane bond. Good saturation to the inorganic particle hydroxy groups inventively effects a high increase of the glass transition point and thus a polyurethane resin with good hydrolytic resistance.

In one embodiment of the third aspect, the isocyanate group-containing adduct is characterized by the molar ratio of the inorganic particle urethane bonds to free isocyanate groups amounting to from 1 to 100 up to 1 to 10.000, preferentially 1:1000 up to 1:10.000. These molar ratios have proven advantageous as they ensure sufficient saturation of the particles' hydroxy groups. Similarly, the preselected molar ratio leaves a sufficient number of free isocyanate groups, responsible for the subsequent development of the polyurethane resin. It was additionally seen that a molar ratio which is too low can lead to a diisocyanate molecule reacting with an isocyanate group to form a urethane bond with a hydroxy group and a second isocyanate group abreacting at the same time with a further hydroxy group. If the molar ratio is maintained, particularly high increases in the glass transition temperature result.

In a further embodiment of the third aspect of the invention, the isocyanate group-containing adduct is characterized by the inorganic particles being particles consisting of silicon dioxide ($SiO_2$), zirconium dioxide ($ZrO_2$), aluminum oxide ($Al_2O_3$) or titanium dioxide ($TiO_2$) or mixtures of these particles. Hydroxy group-containing particles made of silicon, alumina or titanium dioxide are particularly advantageous since they are stable as regards surface-bound hydroxy groups and the number of hydroxy groups can be determined with sufficient precision. Precisely knowing the number of hydroxy groups of the hydroxy group-containing inorganic particles serves in being able to adapt the necessary stoichiometric ratio of the isocyanate groups of the isocyanate component and the hydroxy groups in the polyol component to the production of the potting compound. Moreover, silicon, alumina and titanium dioxide particles are readily and economically available.

In a further embodiment of the third aspect of the invention, the isocyanate group-containing adduct is characterized by the inorganic particles having a weight-average particle size of 200 nm or less, preferentially 150 nm or less, further preferentially 100 nm or less, further preferentially 50 nm or less, and at least 1 nm or greater, or 2 nm or greater, or 5 nm or greater.

In a further embodiment of the third aspect of the invention, the isocyanate group-containing adduct is characterized by the number of urethane bonds between the iso-cyanate component and the inorganic particles amounting to $1 \times 10^{-5}$ mol/g to $1 \times 10^{-2}$ mol/g, preferentially $5 \times 10^{-4}$ mol/g to $1 \times 10^{-2}$ mol/g, relative to the mass of the hydroxy group-containing inorganic particles. At these concentration ratios to the hydroxy groups on the surface of the hydroxy group-containing particles, the adduct formation along with associated increase in glass transition temperature is particularly advantageous.

In a fourth aspect, the invention relates to the use of an isocyanate-containing adduct pursuant to at least one embodiment according to the third aspect in a method for potting a plurality of hollow fiber membranes.

A further implementation of the fourth aspect relates to the use of an isocyanate-containing adduct pursuant to at least one embodiment according to the third aspect for potting a plurality of hollow fiber membranes in the production of filter modules for nano-filtration, ultrafiltration or microfiltration.

EXAMPLE EMBODIMENTS AND METHODS

Materials Used
polyol component: Arathane CW 5631 from the Huntsman company isocyanate component: Arathane HY 5610 from the Huntsman company hydroxy group-containing inorganic particles:
(1) $TiO_2$ UV100 from the Huntsman company
2.5-5 hydroxy groups per $nm^2$ particle surface
weight-average particle size 10 nm
BET surface 330+/−15 $m^2/g$
(2) $TiO_2$ P25 from the Evonik company
4-5 hydroxy groups per $nm^2$ particle surface
weight-average particle size 20-25 nm
BET surface 55 $m^2/g$
(3) $TiO_2$ AT-1 from the Crystal company
1.4 hydroxy groups per $nm^2$ particle surface weight-average particle size 200 nm
BET surface 9 m2/g
(4) SiO$_2$ Aerosil 300 from the Evonik company
1.9 hydroxy groups per nm$^2$ particle surface
weight-average particle size 7 nm
BET surface 300 m2/g Measuring Method for Determining Particle Size Particle size distributions or weight-average particle sizes respectively of fine particles less than 50 nm are determined by means of transmission electron microscopy. A sample of the particles is thereby measured under the transmission electron microscope, whereby the diameter and aspect relationship of elongated particles is determined for a number of particles (1000). The particle size distribution and thus also the weight-average particle size can be calculated therefrom. The laser diffraction method is employed for samples of larger weight-average particle size.

Measuring Method for Determining Glass Transition Temperature—DSC

Figure 1:
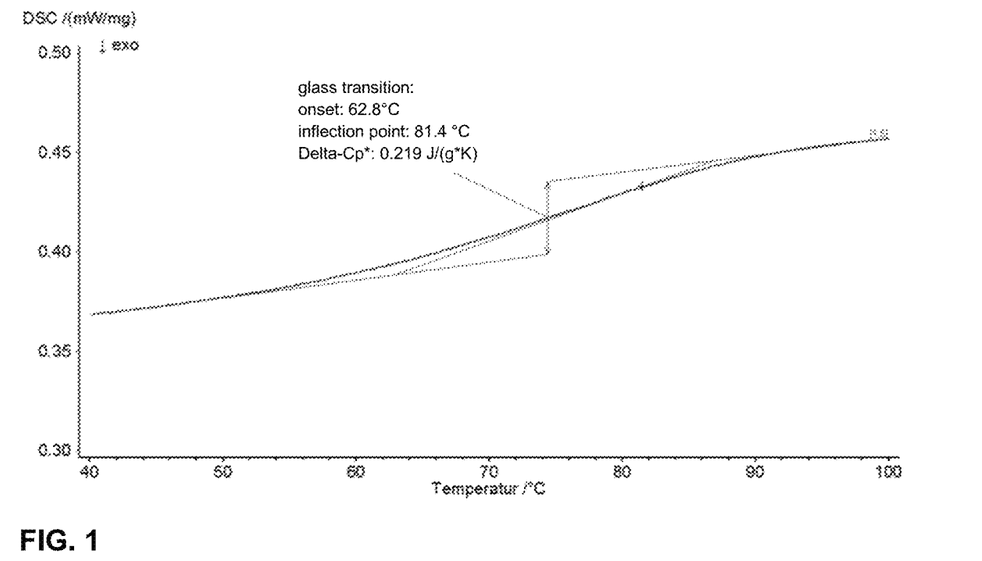
FIG. 1 shows a graph for determining the glass transition point by means of DSC. The graph shows the determination of the onset of the temperature-dependent curve. The onset is determined by applying tangents to the corresponding curve sections.

The glass temperature is determined using a DSC 200F3 instrument from the Netsch company. 5 mg samples of the potting compound hardened into the polyurethane resin are used. The collected samples are positioned in an aluminum crucible in the sample holder of the DSC unit. The area of the sample holder is continuously flushed with nitrogen. The sample was heated within a temperature range of from −5° C. to 120° C. The heating rate was 10° C./min. The sample was thereafter cooled at a cooling rate of 10° C./min. The samples were reheated within a temperature range of from −5° C. to 120° C. The second heat curve was used in the analysis. The glass transition was determined from the onset of the glass transition range of the recorded temperature curve. FIG. 1 shows a graph of a DSC curve for a polyurethane example. Onset is a particularly meaningful parameter for determining the thermal hydrolytic properties because it can indicate the beginning of these changes under increasing temperature. In the example embodiment, comparative example 1 (baseline) is used as the starting point and the ° C. change in the onset of the glass transition point determined.

Measuring Method for Determining Pressure Tightness

Figure 2:
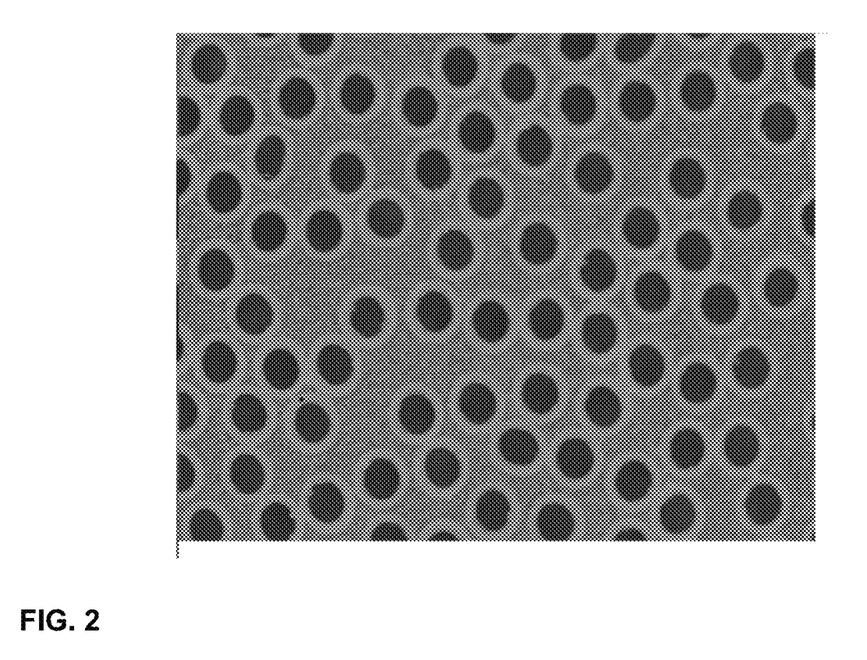
FIG. 2 shows a front section of a potting region in which the hollow fiber membranes are potted in potting material (in this case a polyurethane resin) of a hollow fiber membrane filter (not shown). The illustration shows that the polyurethane resin tightly encases the individual membranes.

To determine pressure tightness, the front edge of a potting zone is visually examined. The front edge is created by cutting through the end of the potting zone. This thereby exposes the lumen-side openings of the hollow fiber membranes in the potting zone. A visual analysis checks whether the hollow fiber membranes in the potting zone are densely encased by the polyurethane resin. FIG. 2 shows an example illustration of a potting zone front edge created in this manner.

Comparative Example 1

100 g of the polyol component is mixed with 25 g of the isocyanate component into a potting compound. A hollow fiber membrane bundle comprising 10752 hollow fiber membranes consisting of polysulfone and polyvinylpyrrolidone is inserted into a cylindrical filter housing having an inside diameter of 34 mm. The same membranes are used in all the examples. The production of such membranes is described in PCT/EP2017/081955. The outer diameter of the fibers amounted to 255 μm, the wall thickness 35 μm. The packing density was 60.5%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. The filter housing with the pressure-tight potted hollow fibers is extracted after 30 min. An approximate 5 mg sample of the potting compound hardened to the polyurethane resin is taken and the glass transition temperature determined by DSC analysis. The determined glass transition temperature (onset) is used as the baseline for the further tests.

Example 1

Aerosil 300 is dried to constant weight at 110° C. 23 g of the Aerosil 300 is mixed with 977 g of the isocyanate component and stirred for 24 h at room temperature. A compound containing the isocyanate-containing adduct of Aerosil 300 and the isocyanate component is obtained. 100 g of the polyol component and 25.6 g of the obtained compound containing the isocyanate-containing adduct is mixed into a potting compound. A hollow fiber membrane bundle comprising 10752 hollow fiber membranes is inserted into a cylindrical filter housing having an inside diameter of 34 mm. The outer diameter of the fibers amounted to 255 μm, the wall thickness 35 μm. The packing density was 60.5%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of SiO$_2$ particles in the potting material amounted to 0.5% by weight. An approximate 5 mg sample of the potting compound hardened to the polyurethane resin is taken and the glass transition temperature determined by DSC analysis. The increase in the polyurethane resin's glass transition temperature compared to the polyurethane resin produced according to comparative example 1 amounted to 6.3° C.

Example 2

UV100 is dried to constant weight at 110° C. 53 g of the UV100 is mixed with 947 g of the isocyanate component and stirred for 24 h at room temperature. A compound containing the isocyanate-containing adduct of UV100 and the isocyanate component is obtained. 100 g of the polyol component and 26.5 g of the obtained compound containing the isocyanate-containing adduct is mixed into a potting compound. A hollow fiber membrane bundle comprising 10752 hollow fiber membranes is inserted into a cylindrical filter housing having an inside diameter of 34 mm. The outer diameter of the fibers amounted to 255 μm, the wall thickness 35 μm. The packing density was 60.5%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of inorganic particles in the potting material amounted to 1.2% by weight. An approximate 5 mg sample of the potting compound hardened to the polyurethane resin is taken and the glass transition temperature determined by DSC analysis. The increase in the polyurethane resin's glass transition temperature compared to the polyurethane resin produced according to comparative example 1 amounted to 7.1° C.

Example 3

UV100 is dried to constant weight at 110° C. 23 g of the UV100 is mixed with 977 g of the isocyanate component and stirred for 24 h at room temperature. A compound containing the isocyanate-containing adduct of UV100 and the isocyanate component is obtained. 100 g of the polyol component and 25.6 g of the obtained compound containing the isocyanate-containing adduct is mixed into a potting compound. A hollow fiber membrane bundle comprising 10752 hollow fiber membranes is inserted into a cylindrical filter housing having an inside diameter of 34 mm. The outer diameter of the fibers amounted to 255 µm, the wall thickness 35 µm. The packing density was 60.5%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of inorganic particles in the potting material amounted to 0.5% by weight. An approximate 5 mg sample of the potting compound hardened to the polyurethane resin is taken and the glass transition temperature determined by DSC analysis. The increase in the polyurethane resin's glass transition temperature compared to the polyurethane resin produced according to comparative example 1 amounted to 8° C.

Example 4

UV100 is dried to constant weight at 110° C. 7.5 g of the UV100 is mixed with 992.5 g of the isocyanate component and stirred for 24 h at room temperature. A compound containing the isocyanate-containing adduct of UV100 and the isocyanate component is obtained. 100 g of the polyol component and 25.2 g of the obtained compound containing the isocyanate-containing adduct is mixed into a potting compound. A hollow fiber membrane bundle comprising 11230 hollow fiber membranes is inserted into a cylindrical filter housing having an inside diameter of 34 mm. The outer diameter of the fibers amounted to 255 µm, the wall thickness 35 µm. The packing density was 63.2%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of inorganic particles in the potting material amounted to 0.2% by weight. An approximate 5 mg sample of the potting compound hardened to the polyurethane resin is taken and the glass transition temperature determined by DSC analysis. The increase in the polyurethane resin's glass transition temperature compared to the polyurethane resin produced according to comparative example 1 amounted to 4.7° C.

Example 5

P25 is dried to constant weight at 110° C. 53 g of the P25 is mixed with 980 g of the isocyanate component and stirred for 24 h at room temperature. A compound containing the isocyanate-containing adduct of P25 and the isocyanate component is obtained. 100 g of the polyol component and 26.5 g of the obtained compound containing the isocyanate-containing adduct is mixed into a potting compound. A hollow fiber membrane bundle comprising 10752 hollow fiber membranes is inserted into a cylindrical filter housing having an inside diameter of 34 mm. The outer diameter of the fibers amounted to 255 µm, the wall thickness 35 µm. The packing density was 60.5%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of $TiO_2$ particles in the potting material amounted to 1.2% by weight. An approximate 5 mg sample of the potting compound hardened to the poly-urethane resin is taken and the glass transition temperature determined by DSC analysis. The increase in the polyurethane resin's glass transition temperature compared to the polyurethane resin produced according to comparative example 1 amounted to 9.5° C.

Example 6

AT1 is dried to constant weight at 110° C. 23 g of the AT1 is mixed with 977 g of the isocyanate component and stirred for 24 h at room temperature. A compound containing the isocyanate-containing adduct of AT1 and the isocyanate component is obtained. 100 g of the polyol component and 25.6 g of the obtained compound containing the isocyanate-containing adduct is mixed into a potting compound. A hollow fiber membrane bundle comprising 10752 hollow fiber membranes is inserted into a cylindrical filter housing having an inside diameter of 34 mm. The outer diameter of the fibers amounted to 255 µm, the wall thickness 35 µm. The packing density was 60.5%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of $TiO_2$ particles in the potting material amounted to 0.5% by weight. An approximate 5 mg sample of the potting compound hardened to the polyurethane resin is taken and the glass transition temperature determined by DSC analysis. The increase in the polyurethane resin's glass transition temperature compared to the polyurethane resin produced according to comparative example 1 amounted to 7.2° C.

Example 7

UV100 is dried to constant weight at 110° C. 96 g of the UV100 is mixed with 904 g of the isocyanate component and stirred for 24 h at room temperature. A compound containing the isocyanate-containing adduct of UV100 and the isocyanate component is obtained. 100 g of the polyol component and 27.7 g of the obtained compound containing the isocyanate-containing adduct is mixed into a potting compound. A hollow fiber membrane bundle comprising 8432 hollow fiber membranes is inserted into a cylindrical filter housing having an inside diameter of 34 mm. The outer diameter of the fibers amounted to 255 μm, the wall thickness 35 μm. The packing density was 47.4%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of inorganic particles in the potting material amounted to 2.0% by weight. An approximate 5 mg sample of the potting compound hardened to the polyurethane resin is taken and the glass transition temperature determined by DSC analysis. The increase in the polyurethane resin's glass transition temperature compared to the polyurethane resin produced according to comparative example 1 amounted to 10.1° C.

Comparative Example 2

UV100 is dried to constant weight at 110° C. 8 g of the UV100 is mixed with 992 g of the isocyanate component and stirred for 24 h at room temperature. A 100.2 g mixture containing the polyol component and UV100 is mixed with 25 g of the isocyanate component into a potting compound. A hollow fiber membrane bundle comprising 10752 hollow fiber membranes is inserted into a cylindrical filter housing having an inside diameter of 34 mm. The outer diameter of the fibers amounted to 255 μm, the wall thickness 35 μm. The packing density was 60.5%. The filter housing is provided for the potting of the hollow fiber membranes. The potting zone includes the fiber ends of the hollow fiber membranes. Polyurethane resin is added until a potting height of 22 mm could be ensured. The potting compound is introduced into the potting zone in the filter housing under rotation pursuant to the method described in EP 2 024 067 A1 and hardened to polyurethane resin at 45° C. A potting formed in which the hollow fiber membranes were encased by the polyurethane resin in pressure-tight manner. The percentage of $TiO_2$ particles in the potting material amounted to 0.2% by weight. An approximate 5 mg sample of the potting compound hardened to the polyurethane resin is taken and the glass transition temperature determined by DSC analysis. The increase in the polyurethane resin's glass transition temperature compared to the polyurethane resin produced according to comparative example 1 amounted to only 0.5° C.

The invention claimed is:
1. A method for potting hollow fiber membranes comprising the steps:
(i) providing a plurality of hollow fiber membranes,
(ii) reacting an isocyanate component containing at least one diisocyanate compound with inorganic particles containing hydroxy groups to form a compound comprising an isocyanate group-containing adduct,
wherein
the isocyanate groups of the isocyanate component are present in stoichiometric excess relative to the hydroxy groups of the hydroxy group-containing inorganic particles, and
wherein
at least a portion of the hydroxy groups of the hydroxy group-containing inorganic particles reacts with at least a portion of the isocyanate groups of the isocyanate component into urethane bonds,
(iii) mixing the obtained compound containing the isocyanate group-containing adduct with a polyol component containing at least one diol compound into a potting compound,
(iv) potting the hollow fiber membranes with the potting compound in at least one potting zone, and
(v) hardening the potting compound in the potting zone into a polyurethane resin.

2. The method according to claim 1, wherein the hydroxy group-containing inorganic particles have a weight-average particle size of 200 nm or less.

3. The method according to claim 1, wherein the percentage of the hydroxy group-containing inorganic particles amount to 2.3% by weight or less in relation to the total weight of the potting compound.

4. The method according to claim 1, wherein the hydroxy group-containing inorganic particles are particles containing silicon dioxide ($SiO_2$), titanium dioxide ($TiO_2$), zirconium dioxide ($ZrO_2$) or aluminum oxide ($Al_2O_3$) or mixtures of said particles.

5. The method according to claim 1, wherein the hydroxy group-containing inorganic particles have a hydroxy group number of $1 \times 10^{-5}$ mol/g to $1 \times 10^{-2}$ mol/g relative to the mass of the hydroxy group-containing inorganic particles.

6. The method according to claim 1, wherein the hydroxy group-containing inorganic particles are dried to constant weight at temperatures of from 100° C. to 150° C. prior to the reaction with the isocyanate component.

7. The method according to claim 1, wherein the compound has a molar ratio of isocyanate component isocyanate groups to hydroxy groups of the hydroxy group-containing inorganic particles of at least 100 to 1.

8. The method according to claim 1, wherein a stoichiometric molar ratio of from 0.9-1.1 to 1.1-0.9 is set for the hydroxy groups of the polyol component and the free isocyanate groups of the compound containing the isocyanate group-containing adduct.

9. The method according to claim 1, wherein the hydroxy group-containing inorganic particles have a weight-average particle size of 150 nm or less.

10. The method according to claim 1, wherein the hydroxy group-containing inorganic particles have a weight-average particle size of 50 nm or less.

11. The method according to claim 1, wherein the hydroxy group-containing inorganic particles have a weight-average particle size of at least 1 nm.

12. The method according to claim 1, wherein the hydroxy group-containing inorganic particles have a weight-average particle size of 5 nm or greater.

13. The method according to claim 1, wherein the percentage of the hydroxy group-containing inorganic particles amount to 1.3% by weight or less in relation to the total weight of the potting compound.

14. The method according to claim 1, wherein the percentage of the hydroxy group-containing inorganic particles amount to 0.75% by weight or less in relation to the total weight of the potting compound.

15. The method according to claim 1, wherein the percentage of the hydroxy group-containing inorganic particles amount to 0.01 wt % or more in relation to the total weight of the potting compound.

16. The method according to claim 1, wherein the percentage of the hydroxy group-containing inorganic particles amount to 0.05 wt % or more in relation to the total weight of the potting compound.

17. The method according to claim 1, wherein the percentage of the hydroxy group-containing inorganic particles amount to 0.1 wt % or more in relation to the total weight of the potting compound.

18. The method according to claim 1, wherein the hydroxy group-containing inorganic particles have a hydroxy group number of $5 \times 10^{-4}$ mol/g to $1 \times 10^{-2}$ mol/g, relative to the mass of the hydroxy group-containing inorganic particles.

19. The method according to claim 1, wherein the compound has a molar ratio of isocyanate component isocyanate groups to hydroxy groups of the hydroxy group-containing inorganic particles of at least 1000:1.

20. The method according to claim 1, wherein a stoichiometric molar ratio of 1, is set for the hydroxy groups of the polyol component and the free isocyanate groups of the compound containing the isocyanate group-containing adduct.

\* \* \* \* \*